US010500532B2

United States Patent
Inuzuka et al.

(10) Patent No.: US 10,500,532 B2
(45) Date of Patent: Dec. 10, 2019

(54) AIR CLEANER

(71) Applicant: TOYOTA BOSHOKU KABUSHIKI KAISHA, Aichi-ken (JP)

(72) Inventors: Yoshinori Inuzuka, Nishio (JP); Ryusuke Kimura, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 161 days.

(21) Appl. No.: 15/683,848

(22) Filed: Aug. 23, 2017

(65) Prior Publication Data

US 2018/0056222 A1 Mar. 1, 2018

(30) Foreign Application Priority Data

Aug. 29, 2016 (JP) .................................. 2016-167240

(51) Int. Cl.
*F02M 35/14* (2006.01)
*B01D 46/42* (2006.01)
(Continued)

(52) U.S. Cl.
CPC ..... *B01D 46/4236* (2013.01); *B01D 46/0002* (2013.01); *B01D 46/10* (2013.01);
(Continued)

(58) Field of Classification Search
CPC ................ B01D 46/0002; B01D 46/10; B01D 46/4236; B01D 2201/28; F02M 35/0201; F02M 35/12; F02M 35/1272; F02M 35/14
(Continued)

(56) References Cited

U.S. PATENT DOCUMENTS 1,953,543 A * 4/1934 Rensink ................. F02M 35/14
181/229
4,713,097 A * 12/1987 Grawi ................... F02M 35/14
123/198 E
(Continued)

FOREIGN PATENT DOCUMENTS

| JP | 60-26157 A | * | 2/1985 |
| JP | 2000-110682 | | 4/2000 |
| JP | 2007-77963 | | 3/2007 |

OTHER PUBLICATIONS

Chinese Office Action in counterpart Chinese Application No. 201710740648.6, dated Jul. 9, 2019 (along with English-language translation).

*Primary Examiner* — Frank M Lawrence, Jr.
(74) *Attorney, Agent, or Firm* — Greenblum & Bernstein, P.L.C.

(57) ABSTRACT

An air cleaner includes a first housing, a second housing, and a filter element. The first housing has an opening. The second housing has an opening that is opposed to the opening of the first housing. The filter element is arranged between the opening of the first housing and the opening of the second housing. At least one of the first housing and the second housing includes a corner portion, a sound reducing member, and an air chamber. The corner portion is constituted by at least two mutually intersecting inner surfaces of the housing. The sound reducing member includes a sound absorbing portion made of an air permeable material. The sound reducing member bridges the at least two inner surfaces and covers the corner portion. The air chamber is defined between the sound reducing member and the corner portion.

9 Claims, 3 Drawing Sheets

(51) Int. Cl.
*B01D 46/10* (2006.01)
*F02M 35/02* (2006.01)
*F02M 35/12* (2006.01)
*B01D 46/00* (2006.01)

(52) U.S. Cl.
CPC .... *F02M 35/0201* (2013.01); *F02M 35/1272* (2013.01); *F02M 35/14* (2013.01); *B01D 2201/28* (2013.01)

(58) Field of Classification Search
USPC ....... 55/385.3, 495; 123/198 E; 96/380, 381, 96/383, 384, 387
See application file for complete search history.

(56) References Cited

U.S. PATENT DOCUMENTS

| | | | | |
|---|---|---|---|---|
| 6,383,268 B2* | 5/2002 | Oda | ................. | B01D 46/0005 55/385.3 |
| 2005/0000362 A1* | 1/2005 | Bause | ................. | B01D 53/02 96/134 |
| 2007/0000467 A1* | 1/2007 | Shaw | ................. | F02M 35/14 123/184.53 |
| 2007/0113740 A1* | 5/2007 | Oda | ................. | B01D 46/0005 96/134 |
| 2011/0139110 A1* | 6/2011 | Miller | ................. | B01D 45/06 123/184.53 |
| 2018/0340499 A1* | 11/2018 | Inuzuka | ................. | F02M 35/14 |

* cited by examiner

AIR CLEANER

BACKGROUND OF THE INVENTION

The present invention relates to an air cleaner for an internal combustion engine.

An air cleaner for an internal combustion engine includes a first housing, a second housing, and a filter element. The first housing has an inlet and an opening. The second housing has an outlet and an opening, which is opposed to the opening of the first housing. The filter element is arranged between the opening of the first housing and the opening of the second housing.

Some of such air cleaners have a sound absorbing member made of a porous material such as foamed plastic in the first housing (see, for example, Japanese Laid-Open Patent Publication No. 2000-110682). In the air cleaner disclosed in the publication, the sound absorbing member is installed such that the inner surface of the first housing is in contact with the entire opposed surface of the sound absorbing member. The sound absorbing member of the air cleaner reduces intake noise.

However, in the above-described air cleaner, the effect of reduction of the intake noise by the sound absorbing member is limited and there is room for improvement.

SUMMARY OF THE INVENTION

An objective of the present invention is to provide an air cleaner capable of effectively reducing intake noise.

To achieve the foregoing objective and in accordance with one aspect of the present invention, an air cleaner is provided that includes a first housing, a second housing, and a filter element. The first housing includes an inlet and an opening. The second housing includes an outlet and an opening that is opposed to the opening of the first housing. The filter element is arranged between the opening of the first housing and the opening of the second housing. At least one of the first housing and the second housing includes a corner portion, a sound reducing member, and an air chamber. The corner portion is constituted by at least two mutually intersecting inner surfaces of the housing. The sound reducing member includes a sound absorbing portion made of an air permeable material and is arranged inside the housing. The sound reducing member bridges the at least two inner surfaces and covers the corner portion. The air chamber is defined between the sound reducing member and the corner portion.

DETAILED DESCRIPTION OF THE PREFERRED EMBODIMENTS

An air cleaner according to one embodiment will now be described with reference to FIGS. 1 to 5.

Figure 1:
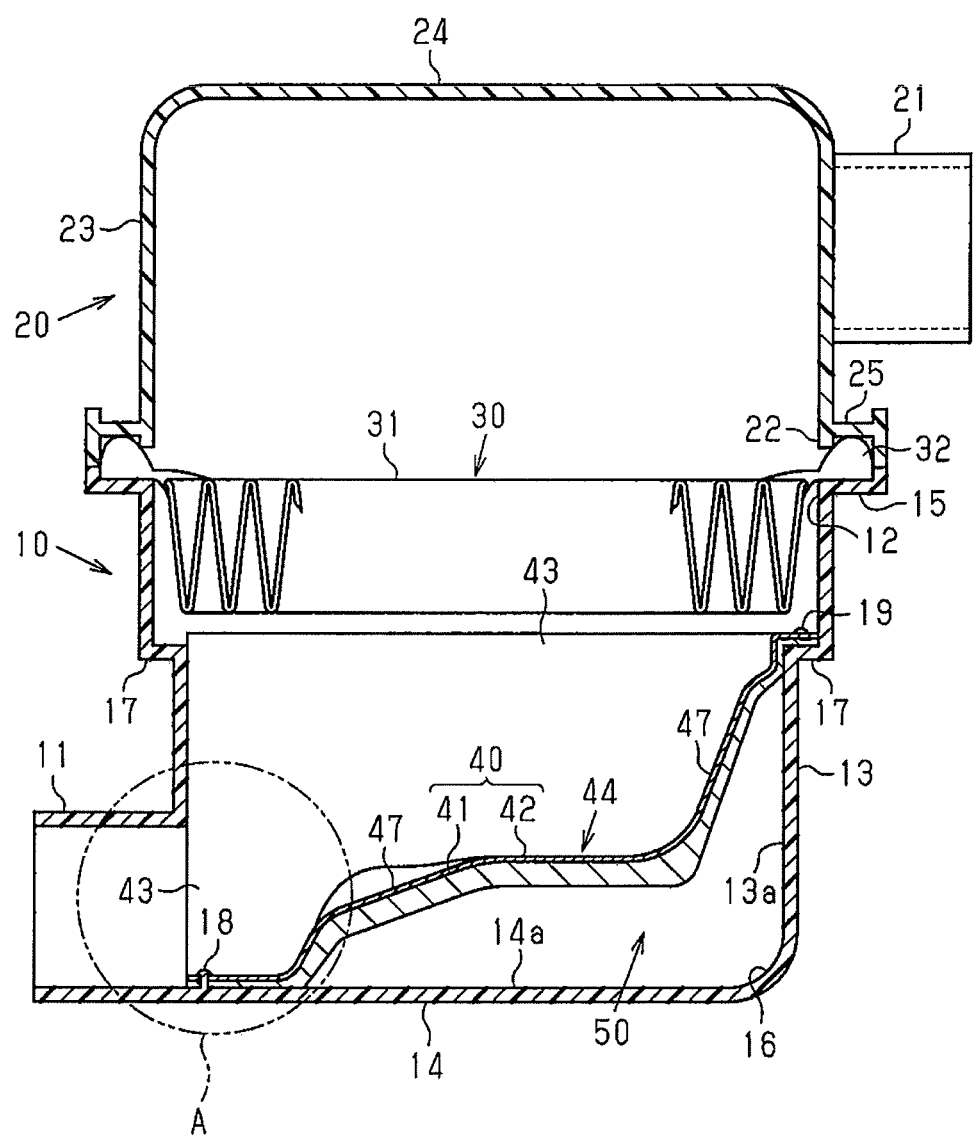
FIG. 1 is a vertical cross-sectional view of an entire air cleaner according to one embodiment.

The air cleaner is designed to be arranged in the intake passage of a vehicle engine. As shown in FIG. 1, the air cleaner includes a first housing 10 having an upper opening 12, a second housing 20 having a lower opening 22 facing the upper opening 12 of the first housing 10, and a filter element 30. The filter element 30 is arranged between the upper opening 12 of the first housing 10 and the lower opening 22 of the second housing 20. Also, the first housing 10 accommodates a sound reducing member 40 for reducing the sound pressure level of the intake noise.

Each component of the air cleaner will now be described.

<First Housing 10>

The first housing 10 has a peripheral wall 13 and a bottom wall 14. The peripheral wall 13 surrounds the upper opening 12, which has a rectangular shape in a plan view. A cylindrical inlet 11 protrudes outward from the peripheral wall 13. An outward protruding flange 15 is provided at the periphery of the upper opening 12. The first housing 10 is made of a hard synthetic plastic.

The peripheral wall 13 includes a stepped portion 17 between the peripheral edge of the upper opening 12 and the bottom wall 14. The stepped portion 17 protrudes outward and extends over the entire periphery of the peripheral wall 13. The outer peripheral edge of the stepped portion 17 is continuous with the peripheral edge of the upper opening 12.

The peripheral wall 13 has four inner surfaces, one of which is an inner surface 13a facing the inlet 11 (the surface on the right side as viewed in FIG. 1). The inner surface 13a intersects with an inner surface 14a of the bottom wall 14. The inner surface 13a of the peripheral wall 13 and the inner surface 14a of the bottom wall 14 constitute a corner portion 16.

<Second Housing 20>

The second housing 20 has a peripheral wall 23 and a top wall 24. The peripheral wall 23 surrounds the lower opening 22, which has a rectangular shape in a plan view. A cylindrical outlet 21 protrudes outward from the peripheral wall 23. An outward protruding flange 25 is provided at the periphery of the lower opening 22. The second housing 20 is made of a hard synthetic plastic.

<Filter Element 30>

The filter element 30 has a filtration portion 31 and a loop-shaped sealing portion 32, which is provided along the outer peripheral edge of the filtration portion 31. The filtration portion 31 is formed by pleating a filtering medium sheet of filter paper or nonwoven fabric.

In the air cleaner, the sealing portion 32 of the filter element 30 is held by the flange 15 of the first housing 10 and the flange 25 of the second housing 20. The sealing portion 32 seals the gap between the first housing 10 and the second housing 20.

<Sound Reducing Member 40>

The sound reducing member 40 bridges the inner surface 14a of the bottom wall 14 and the inner surface 13a of the peripheral wall 13, which is opposed to the inlet 11. The sound reducing member 40 covers the corner portion 16, which is opposed to the inlet 11. The sound reducing member 40 and the corner portion 16 define an air chamber 50 in between.

The sound reducing member 40 has inclined portions 47, which are inclined to approach the filter element 30 as the distance from the inlet 11 increases.

Figure 4:
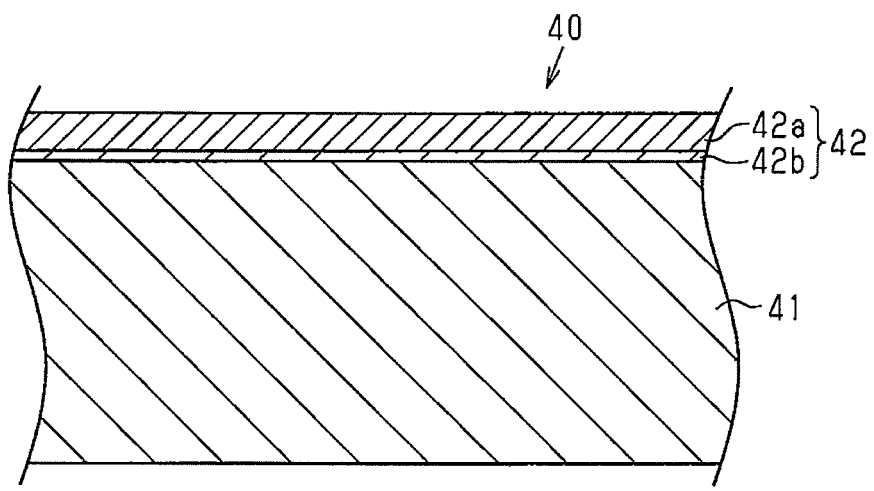
FIG. 4 is an enlarged cross-sectional view showing the sound reducing member of the embodiment.

As shown in FIGS. 1 and 4, the sound reducing member 40 includes a sound absorbing portion 41, which is made of an air permeable material, and a covering layer 42, which is fixed to the surface of the sound absorbing portion 41 opposite to the air chamber 50. The covering layer 42 is made of an air permeable material having a lower air permeability than that of the sound absorbing portion 41.

The sound absorbing portion 41 is formed by a nonwoven fabric sheet. The nonwoven fabric sheet is composed of known sheath-core type conjugate fiber including cores (not shown) made of, for example, polyethylene terephthalate (PET) fiber and sheaths (not shown) made of modified PET having a melting point lower than that of the PET fiber of the cores. The basis weight of the nonwoven fabric sheet is preferably 100 g/m$^2$ to 1500 g/m$^2$. The fineness of the conjugate fiber is preferably 0.01 dtex to 25 dtex. The thickness of the sound absorbing portion 41 is preferably 1 mm to 50 mm.

As shown in FIG. 4, the covering layer 42 includes a covering portion 42a and an air permeable portion 42b arranged between the covering portion 42a and the sound absorbing portion 41.

The covering portion 42a is formed by a nonwoven fabric sheet. The nonwoven fabric sheet is made of, for example, PET fiber. The basis weight of the nonwoven fabric sheet is preferably 20 g/m$^2$ to 1000 g/m$^2$. The fineness of the PET fiber is preferably 0.01 dtex to 25 dtex. The thickness of the covering portion 42a is preferably 0.1 mm to 5 mm.

The air permeable portion 42b is formed by a film having a large number of holes (not shown). The film is a three-layer film composed of, for example, a polyethylene (PE) layer as an adhesive layer, a nylon (NY) layer as a base layer, and a PE layer as an adhesive layer. That is, PE layers are respectively provided on the opposite sides of the NY layer. The sound absorbing portion 41 is adhered to one of the opposite surfaces of the NY layer via a PE layer on the surface. Also, the covering portion 42a is adhered to the other one of the opposite surfaces of the NY layer via a PE layer on the surface. The basis weight of the film is preferably 5 g/m$^2$ to 300 g/m$^2$. The thickness of the film is preferably 0.01 mm to 1 mm. The air permeability of the film is preferably 1 cc/cm$^2$/sec to 30 cc/cm$^2$/sec. The air permeability is measured by a measuring method in which a Frazier-type tester specified in JIS. L. 1096, A-method is used.

A large number of holes in the film are formed by needle punching. By appropriately setting the size and density of the holes, the air permeability of the air permeable portion 42b and consequently the air permeability of the covering layer 42 are set within the above ranges.

The sound absorbing portion 41 and the covering layer 42 are hot pressed to be integrated. At this time, the low melting point modified PET, which constitutes the sound absorbing portion 41, functions as a binder.

In this hot pressing, the degree of compression of an outer edge 43 of the sound reducing member 40 (particularly, the sound absorbing portion 41) is set to be larger than the degree of compression of a portion 44 surrounded by the outer edge 43. That is, the outer edge 43 of the sound reducing member 40 has a shape more compressed in the thickness direction than the portion 44 surrounded by the outer edge 43. In the present embodiment, the air permeability of the outer edge 43 of the sound reducing member 40 is substantially zero.

Figure 2:
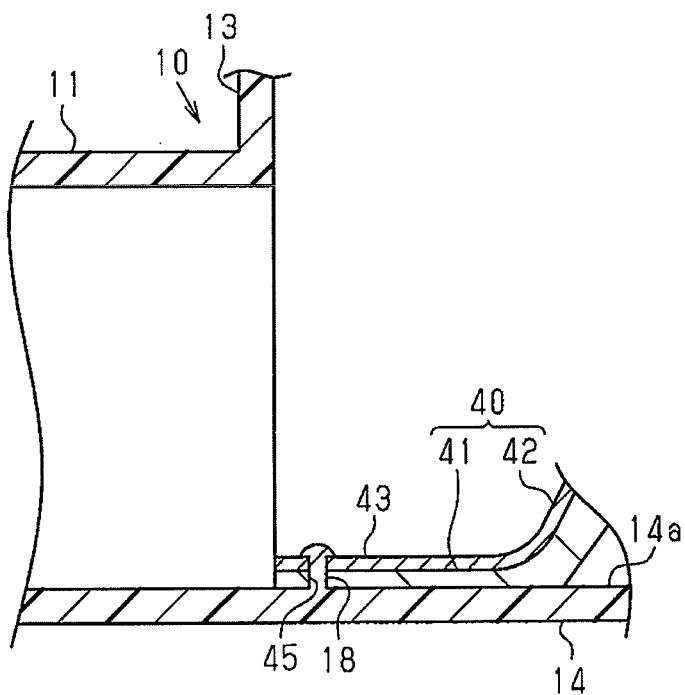
FIG. 2 is an enlarged cross-sectional view showing section A of FIG. 1.

As shown in FIGS. 1 and 2, the outer edge 43 of the sound reducing member 40 is in contact with the inner surface of the bottom wall 14 of the first housing 10.

As shown in FIG. 2, a fixing pin 18 is provided on the inner surface 14a of the bottom wall 14 so as to protrude toward the upper opening 12. The outer edge 43 of the sound reducing member 40 has a hole 45. The fixing pin 18 is inserted into the hole 45. In this state, the distal end of the fixing pin 18 is heated and deformed, so that the outer edge 43 is fixed to the inner surface 14a of the bottom wall 14. That is, the outer edge 43 is fixed to the inner surface 14a of the bottom wall 14 by so-called heat swaging of the distal end of the fixing pin 18 to the outer edge 43.

As shown in FIG. 1, the outer edge 43 of the sound reducing member 40 is in contact with the stepped portion 17 of the peripheral wall 13 of the first housing 10.

Figure 3:
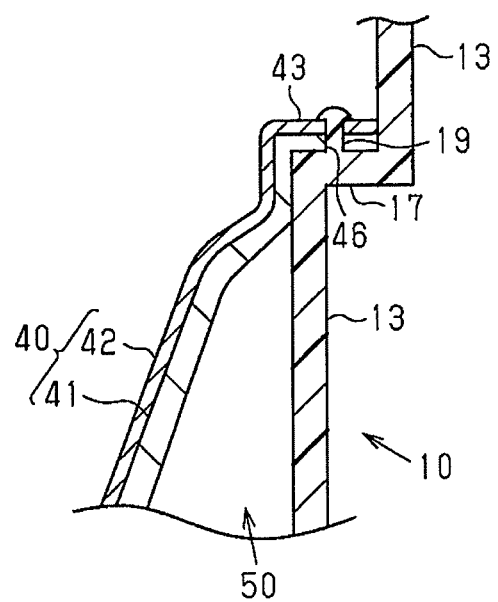
FIG. 3 is an enlarged cross-sectional view showing a manner in which the stepped portion of the first housing is fixed to the outer peripheral edge of the sound reducing member.

As shown in FIG. 3, two of the four corners in the peripheral direction of the stepped portion 17 are each provided with a fixing pin 19, which protrudes toward the upper opening 12. FIG. 3 illustrates one of those two corners. The outer edge 43 of the sound reducing member 40 has holes 46. The fixing pins 19 are respectively inserted into the holes 46. In this state, the distal ends of the fixing pins 19 are heated and deformed, so that the outer edge 43 is fixed to the inner surface of the peripheral wall 13. That is, the outer edge 43 is fixed to the inner surface of the peripheral wall 13 by so-called heat swaging of the distal ends of the fixing pins 19 to the outer edge 43.

Operations of the present embodiment will now be described.

Inside the air cleaner, when the intake noise, which is a compressional wave of air, passes through the sound absorbing portion 41 of the sound reducing member 40, the sound absorbing portion 41 and the air in the gaps of the sound absorbing portion 41 vibrate. The generated vibration energy is then converted into thermal energy. This reduces the sound pressure level of the intake noise.

Figure 5:
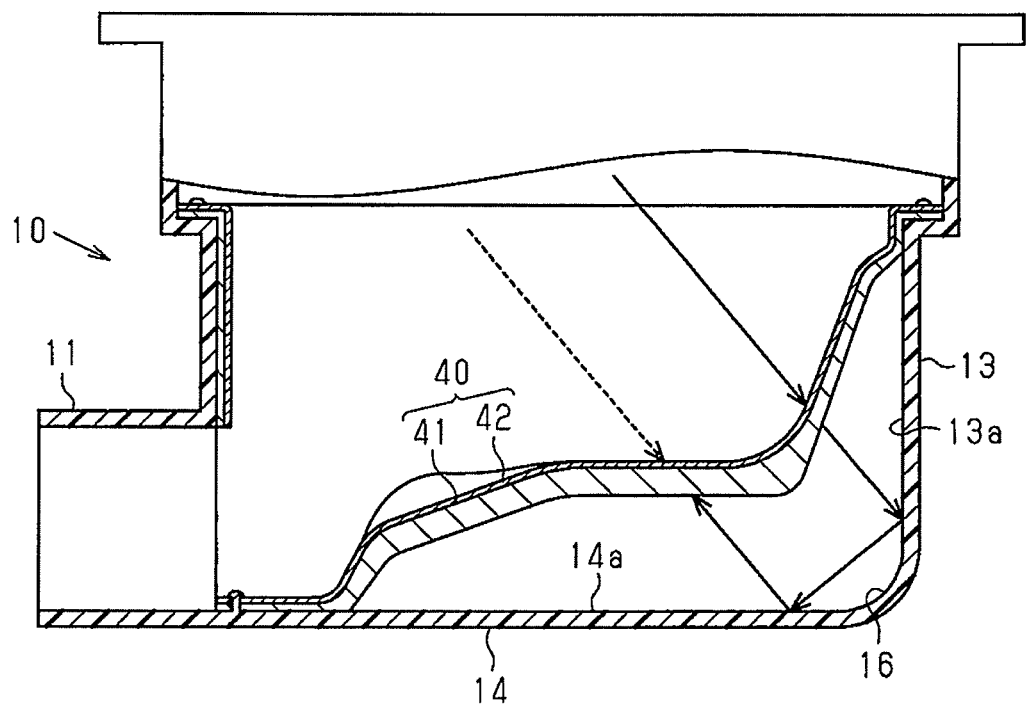
FIG. 5 is an explanatory vertical cross-sectional view of the first housing, illustrating the operation of the embodiment.

FIG. 5 illustrates an incident wave of the intake noise that enters the sound reducing member 40 from outside the air chamber 50 (a broken line). FIG. 5 also illustrates a reflected wave of the intake noise (a solid line). The reflected wave refers to a wave that has been reflected by the inner surface of the first housing 10 to return to the sound reducing member 40 after passing through the sound reducing member 40 and entering the air chamber 50. The incident wave and the reflected wave interfere with each other to weaken each other, thereby reducing the sound pressure level of the intake noise.

Particularly, the closer to the corner portion 16 in the first housing 10, the more concentrated becomes the intake noise, which is a compressional wave of air. Accordingly, an anti-node of a standing wave (stationary wave) is more likely to appear. In other words, the sound pressure level of the intake noise tends to increase toward the corner portion 16.

In contrast, according to the present embodiment, the sound reducing member 40, which covers the corner portion 16 of the first housing 10, bridges the two inner surfaces 13a, 14a, which constitute the corner portion 16. Also, the air chamber 50 is defined between the sound reducing member 40 and the corner portion 16. Therefore, it is possible to effectively reduce the sound pressure level of the intake noise at the corner portion 16 with the sound reducing member 40 while limiting the reduction in the volume of the air cleaner due to the existence of the sound reducing member 40 and the air chamber 50.

Furthermore, unlike an air cleaner that does not have the air chamber 50, it is possible to set, to any appropriate value, the distance by which intake noise that has passed through the sound reducing member 40 travels until it is reflected on the inner surface of the housing and returns to the sound reducing member 40. Therefore, by setting the distance such that part of the incident wave of the intake noise and part of the reflected wave are in antiphase, the incident wave and the reflected wave of the intake noise cancel each other. This effectively reduces the sound pressure level of the intake noise. This operation will hereafter be referred to as a first operation.

On the other hand, when the intake noise traveling inside the air cleaner collides with the covering layer 42 of the sound reducing member 40, the covering layer 42 is pushed and the air in the sound reducing member 40 acts like a spring, so that the covering layer 42 vibrates. Thus, the vibration energy of the covering layer 42 and the vibration energy of the air inside the sound absorbing portion 41 are converted into thermal energy, which reduces the sound pressure level of the intake noise.

The lower the air permeability of the covering layer 42, the lower becomes the frequency at which the covering layer 42 resonates. It is thus possible to effectively reduce the sound pressure level of lower frequency components of the intake noise. In the present embodiment, the covering layer 42 is formed by a material having a lower air permeability than that of the sound absorbing portion 41. Therefore, compared to a case in which the covering layer 42 is not provided, the sound pressure level of the lower frequency components can be effectively reduced. This operation will hereafter be referred to as a second operation.

The air cleaner according to the above described embodiment achieves the following operational advantages.

(1) The first housing 10 has the corner portion 16, which is constituted by the two mutually intersecting inner surfaces 13a, 14a of the first housing 10. The first housing 10 has the sound absorbing portion 41, which is formed by an air permeable material, and the sound reducing member 40, which is arranged inside the first housing 10. The sound reducing member 40 bridges the two inner surfaces 13a, 14a and covers the corner portion 16. The sound reducing member 40 and the corner portion 16 define the air chamber 50 in between.

This configuration effectuates the above-described first operation, thus achieving an effective reduction in the intake noise.

(2) The sound reducing member 40 covers the corner portion 16, which is opposed to the inlet 11. Thus, the intake air flowing into the first housing 10 through the inlet 11 easily passes through the sound reducing member 40. This allows the sound reducing member 40 to reliably reduce the sound pressure level of the intake noise.

(3) The sound reducing member 40 has the inclined portions 47, which are provided on the surface. Each inclined portion 47 is inclined to approach the filter element 30 as the distance from the inlet 11 increases.

With this configuration, the intake air that has flowed into the first housing 10 through the inlet 11 is guided by the inclined portions 47 and is allowed to flow smoothly toward the filter element 30. It is thus possible to regulate the flow of the intake air, thereby reducing the pressure loss of the air cleaner.

(4) The outer edge 43 of the sound reducing member 40 has a shape more compressed in the thickness direction than the portion 44 that is surrounded by the outer edge 43. The outer edge 43 is also in contact with the inner surfaces 13a, 14a of the first housing 10.

This configuration increases the strength of the outer edge 43 of the sound reducing member 40, which is in contact with the inner surfaces 13a, 14a of the first housing 10. Therefore, the sound reducing member 40 is stably held by the first housing 10.

(5) The sound reducing member 40 includes the covering layer 42, which is arranged on the surface of the sound absorbing portion 41 opposite to the air chamber 50. The covering layer 42 is made of an air permeable material having a lower air permeability than that of the sound absorbing portion 41.

This configuration effectuates the above-described second operation. Thus, compared to a sound reducing member that does not have the covering layer 42, the sound pressure level of the lower frequency components is effectively reduced.

<Modifications>

The above-described embodiment may be modified as follows.

The covering portion 42a is not limited to the one formed by a nonwoven fabric sheet made of PET fiber. For example, the covering portion 42a can be formed by a nonwoven fabric sheet made of polyamide (PA) fiber or polypropylene (PP) fiber. Further, the covering portion 42a can be formed by a plastic film or paint. In this case, a large number of holes may be formed by needle punching.

The adhesive layer of the air permeable portion 42b is not limited to polyethylene (PE). For example, the adhesive layer can be made of polypropylene (PP).

For example, the sound absorbing portion 41 can be formed by a nonwoven fabric sheet made of main fiber and binder fiber. In this case, for example, PET fiber can be used as the main fiber and PP fiber can be adopted as the binder fiber. Glass fiber and carbon fiber can also be used as the main fiber. In these cases, for example, PA fiber or PP fiber can be used as the binder fiber.

The sound absorbing portion 41 is not limited to the one that is formed by a nonwoven fabric sheet. For example, the sound absorbing portion 41 may be made of a foamed material such as foamed polyurethane.

The covering layer 42 may be omitted, so that the sound reducing member 40 is constituted solely by the sound absorbing portion 41. Even in this case, the above-described first operation will be effectuated.

The surface profile of the sound reducing member 40 may be changed as necessary.

The sound reducing member 40 may be provided to cover a corner portion not opposed to the inlet 11 and an air chamber may be defined between that corner portion and the sound reducing member 40.

In the above-described embodiment, the sound reducing member 40 is provided to cover the corner portion 16 constituted by the two inner surfaces 13a, 14a of the first housing 10. Instead of this configuration, a sound reducing member may be provided to cover a corner portion constituted by two mutually adjacent inner surfaces of the peripheral wall 13 and the inner surface of the bottom wall 14. That is, a sound reducing member may be provided to cover a corner portion constituted by three mutually intersecting inner surfaces. This further effectively limits the reduction in the volume of the air cleaner due to the existence of the sound reducing member and the air chamber.

The sound reducing member 40 may be provided inside the second housing 20, and the air chamber 50 may be defined between the sound reducing member 40 and a corner portion of the second housing 20.

The invention claimed is:

1. An air cleaner comprising:
a first housing including an inlet and an opening;
a second housing including an outlet and an opening that is opposed to the opening of the first housing; and
a filter element arranged between the opening of the first housing and the opening of the second housing,
wherein at least one of the first housing and the second housing includes a corner portion that is constituted by at least two mutually intersecting inner surfaces of the housing, a sound reducing member, which includes a sound absorbing portion made of an air permeable material and is arranged inside the housing, wherein the sound reducing member bridges the at least two inner surfaces and covers the corner portion, and an air chamber, which is defined between the sound reducing member and the corner portion, wherein an outer edge of the sound reducing member is in contact with an inner surface of the housing.

2. The air cleaner according to claim 1, wherein the sound reducing member is arranged inside the first housing, and the corner portion is opposed to the inlet.

3. The air cleaner according to claim 2, wherein the sound reducing member includes an inclined portion provided on a surface of the sound reducing member, and the inclined portion is inclined to approach the filter element as a distance from the inlet increases.

4. The air cleaner according to claim 1, wherein the sound reducing member is arranged inside the first housing, the outer edge of the sound reducing member has a shape more compressed in a thickness direction than a portion of the sound reducing member that is surrounded by the outer edge, and the outer edge of the sound reducing member is in contact with an inner surface of the first housing.

5. An air cleaner comprising:

a first housing including an inlet and an opening;

a second housing including an outlet and an opening that is opposed to the opening of the first housing; and a filter element arranged between the opening of the first housing and the opening of the second housing, wherein at least one of the first housing and the second housing includes a corner portion that is constituted by at least two mutually intersecting inner surfaces of the housing, a sound reducing member, which includes a sound absorbing portion made of an air permeable material and is arranged inside the housing, wherein the sound reducing member bridges the at least two inner surfaces and covers the corner portion, and an air chamber, which is defined between the sound reducing member and the corner portion, wherein the sound reducing member includes a covering layer, which is arranged on a surface of the sound absorbing portion that is opposite to the air chamber, and the covering layer is made of an air permeable material having a lower air permeability than that of the sound absorbing portion.

6. The air cleaner according to claim 5, wherein an outer edge of the sound reducing member is in contact with an inner surface of the housing.

7. The air cleaner according to claim 5, wherein the sound reducing member is arranged inside the first housing, and the corner portion is opposed to the inlet.

8. The air cleaner according to claim 7, wherein the sound reducing member includes an inclined portion provided on a surface of the sound reducing member, and the inclined portion is inclined to approach the filter element as a distance from the inlet increases.

9. The air cleaner according to claim 5, wherein the sound reducing member is arranged inside the first housing, an outer edge of the sound reducing member has a shape more compressed in a thickness direction than a portion of the sound reducing member that is surrounded by the outer edge, and the outer edge of the sound reducing member is in contact with an inner surface of the first housing.

* * * * *